US012445345B2

(12) United States Patent
Chan et al.

(10) Patent No.: US 12,445,345 B2
(45) Date of Patent: Oct. 14, 2025

(54) REPLAY OF ANALYTICS FOR A NETWORK MANAGEMENT SYSTEM

(71) Applicant: Juniper Networks, Inc., Sunnyvale, CA (US)

(72) Inventors: Chi Fung Michael Chan, Mountain View, CA (US); Atul Bhaskarrao Patil, San Ramon, CA (US); Diheng Qu, Palo Alto, CA (US); Aleksei Goditskii, Novosibirsk (RU); Aleksandr Gordeev, Saratov (RU); Roman Bogorodskiy, Saratov (RU)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/003,297

(22) PCT Filed: Jun. 22, 2022

(86) PCT No.: PCT/RU2022/000191
§ 371 (c)(1),
(2) Date: Dec. 23, 2022

(87) PCT Pub. No.: WO2023/249506
PCT Pub. Date: Dec. 28, 2023

(65) Prior Publication Data
US 2024/0243963 A1    Jul. 18, 2024

(51) Int. Cl.
*H04L 41/0631*    (2022.01)
*G06F 16/9537*    (2019.01)
*H04L 43/06*    (2022.01)

(52) U.S. Cl.
CPC ...... *H04L 41/0631* (2013.01); *G06F 16/9537* (2019.01); *H04L 43/06* (2013.01)

(58) Field of Classification Search
CPC .. H04L 41/0631; H04L 43/06; G06F 16/9537
See application file for complete search history.

(56) References Cited

U.S. PATENT DOCUMENTS 10,200,248 B1    2/2019    Jiang et al.
10,516,761 B1    12/2019   A et al.
(Continued)

OTHER PUBLICATIONS

International Search Report and Written Opinion of International Application No. PCT/RU2022/000191 dated Mar. 16. 2023, 9 pp.
(Continued)

*Primary Examiner* — Emmanuel L Moise
*Assistant Examiner* — Zia Khurshid
(74) *Attorney, Agent, or Firm* — Shumaker & Sieffert, P.A.

(57) ABSTRACT

A method includes storing, by one or more processors, a plurality of intent graphs for a network and receiving, the by one or more processors, a query indicating a time. The method further includes determining, by the one or more processors, a subset of telemetry data that corresponds to the time range using the time indicated by the query. The method further includes generating, by the one or more processors and based on an intent graph of the plurality of intent graphs that is associated with a time range that includes the time indicated by the query and based on the subset of the telemetry data, one or more metrics and outputting, by the one or more processors, an indication of the one or more metrics.

20 Claims, 10 Drawing Sheets

(56) References Cited

U.S. PATENT DOCUMENTS

| | | | |
|---|---|---|---|
| 2005/0058076 A1* | 3/2005 | Richardson | H04L 43/18 370/241 |
| 2014/0181292 A1 | 6/2014 | Venkataswami et al. | |
| 2017/0257291 A1 | 9/2017 | Zhao et al. | |
| 2019/0182119 A1* | 6/2019 | Ratkovic | H04L 43/06 |
| 2020/0366756 A1 | 11/2020 | Vittal | |
| 2021/0234754 A1* | 7/2021 | Golla | H04L 41/0806 |
| 2021/0409282 A1 | 12/2021 | Patki et al. | |
| 2023/0102002 A1* | 3/2023 | Garapati | G06N 5/022 709/223 |
| 2023/0179525 A1* | 6/2023 | Pai | H04L 43/026 709/223 |

OTHER PUBLICATIONS

Enns, "NETCONF Configuration Protocol," Network Working Group, RFC 4741, Dec. 2006, 95 pp.

Harrington et al., "An Architecture for Describing Simple Network Management Protocol (SNMP) Management Frameworks," Network Working Group, RFC 3411, Dec. 2002, 58 pp.

"Time Voyager (Blueprints)" Juniper Apstra 4.0 User Guide, Juniper Networks, Inc. Jun. 17, 2022, 5 pp.

* cited by examiner

Spine1 - rack_2_001_leaf1
Swp3-swp1

610

| | |
|---|---|
| | 10Gbps |

0  2  4  6  8  10

| | |
|---|---|
| Average alignment errors per second | 0 |
| Average fcs errors per second | 0 |
| Average Giants per second | 0 |
| Average Runts per second | 0 |
| Average Received bits per second | 2190 |
| Average Transmitted bits per second | 2054 |
| Average Received broadcast packets per second | 0 |
| Average Transmitted broadcast packets per second | 0 |
| Average Received discard packets per second | 0 |
| Average Transmitted discard packets per second | 0 |
| Average Received error packets per second | 0 |
| Average Transmitted error packets per second | 0 |
| Average Received multicast packets per second | 0 |
| Average Transmitted multicast packets per second | 0 |
| Average Received unicast packets per second | 4 |
| Average Transmitted unicast packets per second | 3 |
| Average Rx Utilization | 0 |
| Average Tx Utilization | 0 |
| Average Symbol errors per second | 0 |
| Speed | 10.00 Gbps |

FIG. 9

REPLAY OF ANALYTICS FOR A NETWORK MANAGEMENT SYSTEM

This application is a national stage entry of International Patent Application No. PCT/RU2022/000191, filed 22 Jun. 2022, the entire contents of which is incorporated herein by reference.

TECHNICAL FIELD

The disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Ethernet Virtual Private Network (EVPN), Layer Three Virtual Private Network (L3VPN), Virtual Private Local Area Network Service (VPLS), and Peer to Peer (P2P) services. Other services include network configuration services, such as Dot1q VLAN Service, Border Gateway Protocol (BGP), VXLAN, Spanning Tree Protocol, Access Control Lists, or route maps implementing routing policies. Network management systems (NMSs) and NMS devices, also referred to as controllers or controller devices, may support these services such that an administrator (e.g., a network administrator) can easily create and manage these high-level network configuration services.

SUMMARY

In general, this disclosure describes techniques to "replay" an intent graph indicating a state of a network and telemetry data to generate one or more metrics (e.g., a potential root cause fault, interface traffic, transceiver load, transceiver power, etc.) for a previous point in time (e.g., during a past outage or when a service was impacted). One or more metrics may include, for example, a potential root cause fault, interface traffic, transceiver load, or transceiver power. A previous point in time may include, for example, a past outage or when a service was impacted. For example, in response to a query at a particular time (e.g., Friday 6 AM to Friday 6 PM), there may be telemetry data for millions of routes for a network configured for a previous intent graph different from a currently implemented intent graph. Moreover, changes in software and hardware components of the network that occur between a current time and the previous point of time may further complicate a replay of metrics.

In accordance with the techniques of the disclosure, a network controller may be configured to determine relevant metrics for a network service at a time that occurred before a current time. For example, the network controller may select an intent graph that corresponds to a time that a network service is impacted. In this example, the network controller may determine a subset of telemetry data that corresponds to the time that a network service is impacted. The network controller may output the selected intent graph and the selected telemetry data to an RCI core, which may generate one or more metrics (e.g., potential root cause faults) for review by the network administrator. In some examples, the network controller may output the selected intent graph and the selected telemetry data to an analytics engine, which may generate one or more metrics (e.g., a receiver utilization for an interface, a transmitter utilization for an interface, or a speed) for review by the administrator.

This is in contrast to systems in which a network administrator may review metrics only in-real time. That is, a root cause identification (RCI) core may generate metrics using an intent graph (e.g., blueprint) currently implemented by a network and telemetry data being generated by the network. Such a system can store, for example, a plurality of revisions of the intent graph, the stored revisions are not available for replay. Rather, such as system only can be used to restore the network to a previously implemented graph intent by implementing the previous graph intent on the network, which may not be necessary or desirable.

In some systems, a network administrator may use an analytics engine, which may help to generate intent-based analytics (IBA). An example benefit of IBA is the ability to analyze telemetry data across multiple devices and across time, contextualize the analysis using the intent graph, and automatically update the analysis when the intent graph is updated. When the intent graph changes, the computation may be updated. The analytics engine may be configured to use replay.

In one example, a method includes storing, by one or more processors, a plurality of intent graphs for a network. Each intent graph of the plurality of intent graphs comprises nodes representing components of the network and edges representing connections between the nodes. Each intent graph of the plurality of intent graphs is associated with a corresponding different time range within a time period. The method further includes receiving, by the one or more processors, a query indicating a time and determining, by the one or more processors, a subset of telemetry data, from telemetry data received from a set of network devices of the network over the time period, that corresponds to the time range using the time indicated by the query. The method further includes generating, by the one or more processors and based on an intent graph of the plurality of intent graphs that is associated with a time range that includes the time indicated by the query and based on the subset of the telemetry data, one or more metrics and outputting, by the one or more processors, an indication of the one or more metrics.

In another example, a controller device includes a memory configured to store telemetry data received from a set of network devices of a network over a time period and configured to store an indication of each intent graph of a plurality of intent graphs for the network, wherein each intent graph of the plurality of intent graphs comprises nodes representing components of the network and edges representing connections between the nodes and each intent graph of the plurality of intent graphs is associated with a corresponding different time range within the time period. The controller device further includes one or more processors coupled to the memory. The memory stores instructions that, when executed, cause the one or more processors to receive a query indicating a time and determine a subset of the telemetry data that corresponds to the time range using the time indicated by the query, generate one or more metrics based on an intent graph of the plurality of intent graphs associated with a time range that includes the time indicated by the query and the subset of the telemetry data, and output an indication of the one or more metrics.

In one example, a computer-readable storage medium having stored thereon instructions that, when executed, cause a processor to store a plurality of intent graphs for a network. Each intent graph of the plurality of intent graphs comprises nodes representing components of the network and edges representing connections between the nodes and wherein each intent graph of the plurality of intent graphs is associated with a corresponding different time range within a time period. The instructions further cause the processor to receive a query indicating a time and determine a subset of telemetry data, from telemetry data received from a set of network devices of the network over the time period, that corresponds to the time range using the time indicated by the query. The instructions further cause the processor to generate, based on an intent graph of the plurality of intent graphs that is associated with a time range that includes the time indicated by the query and based on the subset of the telemetry data, one or more metrics and output an indication of the one or more metrics.

The details of one or more examples are set forth in the accompanying drawings and the description below. Other features, objects, and advantages will be apparent from the description and drawings, and from the claims.

BRIEF DESCRIPTION OF DRAWINGS

FIG. 9 is a conceptual diagram illustrating an example of information displayed in response to an interaction by the administrator according to techniques of this disclosure.

DETAILED DESCRIPTION

Figure 1:
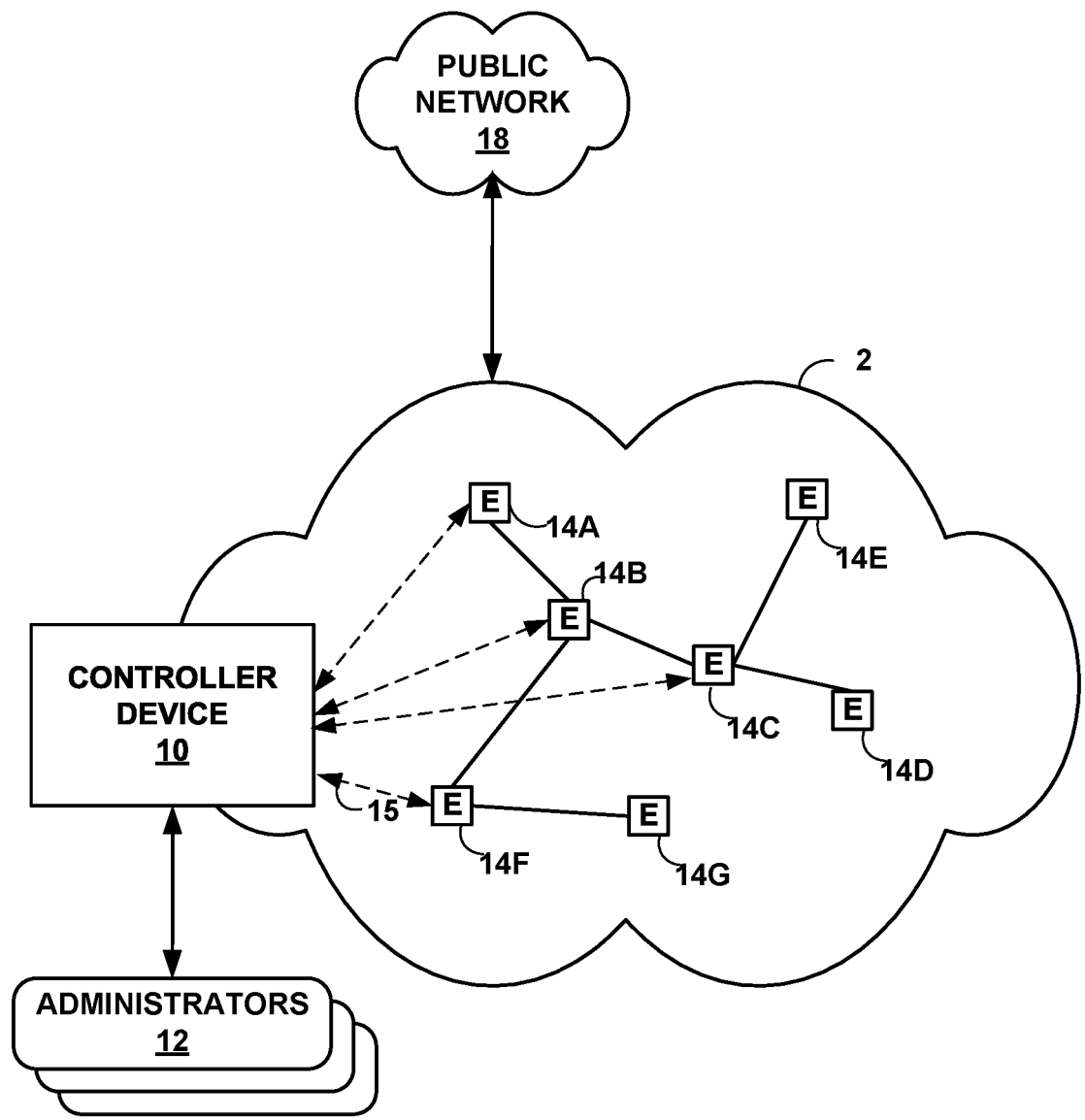
FIG. 1 is a block diagram illustrating an example including elements of an enterprise network that are managed using a controller device.

FIG. 1 is a block diagram illustrating an example including elements of an enterprise network 2 that are managed using a controller device 10. Managed elements 14A-14G (collectively, "elements 14") of enterprise network 2 include network devices interconnected via communication links to form a communication topology in order to exchange resources and information. Elements 14 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any discrete data unit defined by any protocol, such as, for example, Ethernet, a cell defined by the Asynchronous Transfer Mode (ATM) protocol, Transmission Control Protocol (TCP), or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content.

Controller device 10 is communicatively coupled to elements 14 via enterprise network 2. Controller device 10, in some examples, forms part of a device management system, although only one device of the device management system is illustrated for purpose of example in FIG. 1. Controller device 10 may be coupled either directly or indirectly to the various elements 14. Once elements 14 are deployed and activated, administrator 12 uses controller device 10 to manage the network devices using a device management protocol. One example device protocol is the Simple Network Management Protocol (SNMP) that allows controller device 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

Controller device 10, also referred to herein as a network management system (NMS) or NMS device, and elements 14 are centrally maintained by an IT group of the enterprise. Administrator 12 interacts with controller device 10 to remotely monitor and configure elements 14. For example, administrator 12 may receive alerts from controller device 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrator 12 uses controller device 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. Examples of interfaces using text-based commands may include one or more of NX-API™, Arista EOS™, Juniper Telemetry Interface™, and gNMI telemetry collection interface. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of elements 14, e.g., element 14F, using controller device 10, to directly configure element 14F. In this manner, a user can provide commands in a format for execution directly to elements 14.

Further, administrator 12 can also create scripts that can be submitted by controller device 10 to any or all of elements 14. For example, in addition to a CLI interface, elements 14 also provide interfaces for receiving scripts that specify the commands in accordance with a scripting language. In a sense, the scripts may be output by controller device 10 to automatically invoke corresponding remote procedure calls (RPCs) on the managed elements 14. The scripts may conform to, e.g., extensible markup language (XML) or another data description language.

Administrator 12 uses controller device 10 to configure elements 14 to specify certain operational characteristics that further the objectives of administrator 12. For example, administrator 12 may specify for an element 14 a particular operational policy regarding security, device accessibility, traffic engineering, quality of service (QOS), network address translation (NAT), packet filtering, packet forwarding, rate limiting, or other policies. Controller device 10 uses one or more network management protocols designed for management of configuration data within managed network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741, the entire contents of which are incorporated herein by reference. Controller device 10 may establish NETCONF sessions with one or more of elements 14.

A user "intent" may represent a single source of truth, from which device configurations are derived. An intent-based networking system may help to allow administrators to describe the intended network/compute/storage state.

Intents may be represent a state and may be persisted across system restarts so the user does not lose the source of truth for their network's management and operation. For example, suppose the intent starts with a network topology definition with servers connected to leaf switches, where the servers host user workloads. In this example, traffic between the servers could vary over time and/or hotspots could develop in the network. For instance, a workload could be deployed on 2 different racks of servers that the traffic between the communicating processes to traverse an oversubscribed fabric. But it is possible to detect this with telemetry and then update the workload distribution so that endpoints get moved to the same rack, hence minimizing the use of oversubscribed links in the fabric. In this example, the intent could be modeling the policy of how widely distributed (e.g. how many racks) a workload's endpoint could be spread across, and/or how much fabric links are supposed to be used by this workload. In this way, the policy could be updated based on the current network state.

Intents may be represented as intent data models, which may be modeled using unified graphs. Intent data models may be represented as connected graphs, so that business policies can be implemented across intent data models. For example, data models may be represented using connected graphs having vertices connected with has-edges and reference (ref) edges. Controller devices may model intent data models as unified graphs, so that the intent models can be represented as connected. In this manner, business policies can be implemented across intent data models. When intents are modeled using a unified graph model, extending new intent support needs to extend the graph model and compilation logic.

Controller device 10 may be configured to accept high-level configuration data, or intents, from administrator 12 (which may be expressed as structured input parameters, e.g., according to YANG, which is described in Bjorklund, "YANG-A Data Modeling Language for the Network Configuration Protocol (NETCONF)," Internet Engineering Task Force, RFC 6020, October 2010, available at tools.ietf.org/html/rfc6020).

In order to configure devices to perform the intents, a user (such as an administrator 12) may write translation programs that translate high-level configuration instructions (e.g., instructions according to an intent data model, which may be expressed as a unified graph model) to low-level configuration instructions (e.g., instructions according to a device configuration model). As part of configuration service support, administrator 12 may provide the intent data model and a mapping between the intent data model to a device configuration model.

Controller device 10 may also be configured to output respective sets of low-level device configuration data, e.g., device configuration additions, modifications, and removals. Additional details regarding an example process for translating high level configuration information to low-level device configuration information can be found in, e.g., Jiang et al., "TRANSLATING HIGH-LEVEL CONFIGURATION INSTRUCTIONS TO LOW-LEVEL DEVICE CONFIGURATION," U.S. patent application Ser. No. 15/198,657, filed Jun. 30, 2016, the entire contents of which are hereby incorporated by reference. This disclosure refers to low-level device configuration produced from intents (e.g., produced by compiling or translating the intents) as "device-level intent configuration information" or "intent configuration," to distinguish this device-level configuration from out of band (OOB) device-level configuration. In some examples, controller device 10 may use YANG modeling for an intent data model and low-level device configuration models. This data may contain relations across YANG entities, such as list items and containers. In some examples, controller device 10 may convert a YANG data model into a database model, and convert YANG validations into data validations. Techniques for managing network devices using a graph model for high level configuration data is described in "CONFIGURING AND MANAGING NETWORK DEVICES USING PROGRAM OVERLAY ON YANG-BASED GRAPH DATABASE," U.S. patent application Ser. No. 15/462,465, filed Mar. 17, 2017, the entire contents of which are hereby incorporated by reference.

Controller device 10 may receive data from one of administrators 12 representing any or all of create, update, and/or delete actions with respect to the intent data model. Controller device 10 may be configured to use the same compilation logic for each of create, update, and delete as applied to the graph model.

In general, controllers like controller device 10 may use a hierarchical data model for intents, low-level data models, and resources. The hierarchical data model can be based on YANG or YAML. The hierarchical data model can be represented as a graph, as discussed above. Use of intents may ease the management of networks and intents are declarative. To realize intents, controller device 10 may attempt to select optimal resources from elements 14 and/or from other devices.

In general, controller device 10 may be configured to translate high-level configuration (e.g., intents received from an administrator for a plurality of managed network devices) to low-level configuration, which may also be referred to herein as "device-level configuration" (to be applied to the managed network devices themselves). In some instances, controller device 10 may receive an indication of a topology and a role for element 14A and generate device-level configuration information for element 14A. For example, administrator 12 may select a topology and role for element 14A and provide an intent. In some examples, controller device 10 may generate device-level configuration for element 14A based on the role (e.g., spine or leaf) of element 14A in the topology (e.g., a spine and leaf topology), the topology, and the intent.

In accordance with the techniques of the disclosure, controller device 10 may be configured to replay historical metrics for network devices 14. For example, controller device 10 may receive a query indicating a time and, optionally, a network service managed by controller device 10. For instance, controller device 10 may receive the query from administrator 12 indicating a time (e.g., 6 PM Friday to 6 AM Saturday) for which the administrator is interested in understanding the state of the network. The time indicated in the query may be a single point in time, or a time range. In this example, controller device 10 may select an intent graph, from a plurality of intent graphs for network 2, that is associated with a time range that includes the time indicated by the query. For example, the controller device 10 may select an intent graph that was implemented by controller device 10 at the time indicated by the query (e.g., at 6 PM Friday). In some examples, each intent graph of the plurality of intent graphs includes nodes representing components of network 2 and edges representing connections between the nodes and each intent graph of the plurality of intent graphs is associated with a corresponding different time range (e.g., a first intent graph is from 6 PM Monday to 3 PM Wednesday and a second intent graph is from 3 PM Wednesday to 5 PM Friday). In some examples, the different time ranges are non-overlapping time ranges, in which any given time is included in only a single time range, and thus is associated with only a single intent graph. In some examples, if the time range spans over two intent graphs, controller device 10 may select a first intent model that was implemented at the beginning of the time range. In this example, controller device 10 may select a second intent model that was implemented at a time during the time range when the first intent model was changed to the second intent model.

Controller device 10 may determine a subset of telemetry data, from a database of telemetry data received from a set of network devices of network 2 over the time period, that corresponds to the time range using the time indicated by the query and the network service indicated by the query. For example, controller device 10 may determine telemetry data measured by network devices 14 while controller device 10 implemented the selected graph model and at the time indicated by the query.

Controller device 10 may generate, based on an intent graph that is associated with a time range that includes the time indicated by the query and based on the subset of the telemetry data, one or more metrics. For example, controller device 10 may perform a network analysis operation using the selected intent graph and the subset of the telemetry data to generate one or more metrics. For example, controller device 10 may output the selected intent and the subset of telemetry data to a root cause fault engine (e.g., included in controller device 10 or outside of controller device 10) and the root cause fault engine outputs the one or more metrics as, for example, one or more candidate root cause faults. A root cause fault may refer to one or more issues that cause symptoms and impacts. Symptoms may be observable (e.g., using device telemetry) and may be used to match root cause faults. Impacts may refer to causal consequences of root cause faults but may not be observable. For example, a root cause fault may be a link being down (e.g., a cable is broken). In this example, symptoms may include telemetry data indicating, for example, interfaces on both ends of a link being operationally down and/or no neighbor reported for both interfaces and the impact may include degraded network bandwidth for services whose traffic could have used the down link.

In some examples, controller device 10 may output the selected intent and the subset of telemetry data to an analytics engine and the analytics engine outputs the one or more metrics as, for example, one or more of an intent-based analytics alert, an average alignment of errors per second for a network device 14A, an average Frame Check Sequence (FCS) errors per second for network device 14A, an average number of received bits per second for network device 14A, or an average transmitted bits per second for network device 14A.

Controller device 10 may output an indication of the one or more metrics. For example, controller device 10 may generate data representing a user interface presenting the one or more metrics and output, for display, the data representing the user interface. As another example, controller device 10 may output the indication of the one or more metrics as a text message or email to the administrator. In this way, administrator 12 may review the one or more metrics (e.g., displayed in a user interface) to help to identify root cause faults (RCFs) of hardware components and/or software components of network 2. In this way, administrator 12 may be directed to a set of potential root cause faults (e.g., less than 10, less than 5, less than 3, or only 1), which may enable faster identification of the actual root cause fault for administrator 12 and thereby reduce an amount of time that a customer is impacted by a network fault. Administrator 12 may review the one or more metrics (e.g., displayed in a user interface) to help to monitor analytics of hardware components and/or software components of network 2. In this way, administrator 12 may be directed to a relatively small set of relevant analytics (e.g., less than 10, less than 5, less than 3, or only 1) compared to manually reviewing analytics, which may enable faster identification of network issues and thereby reduce an amount of time that a customer is impacted by a network issue. Furthermore, generating, based on an intent graph that is associated with a time range that includes the time indicated by the query and based on the subset of the telemetry data, one or more metrics may help controller device 10 to replay the one or more metrics without having to actually commit the intent graph to network 2.

Figure 2:
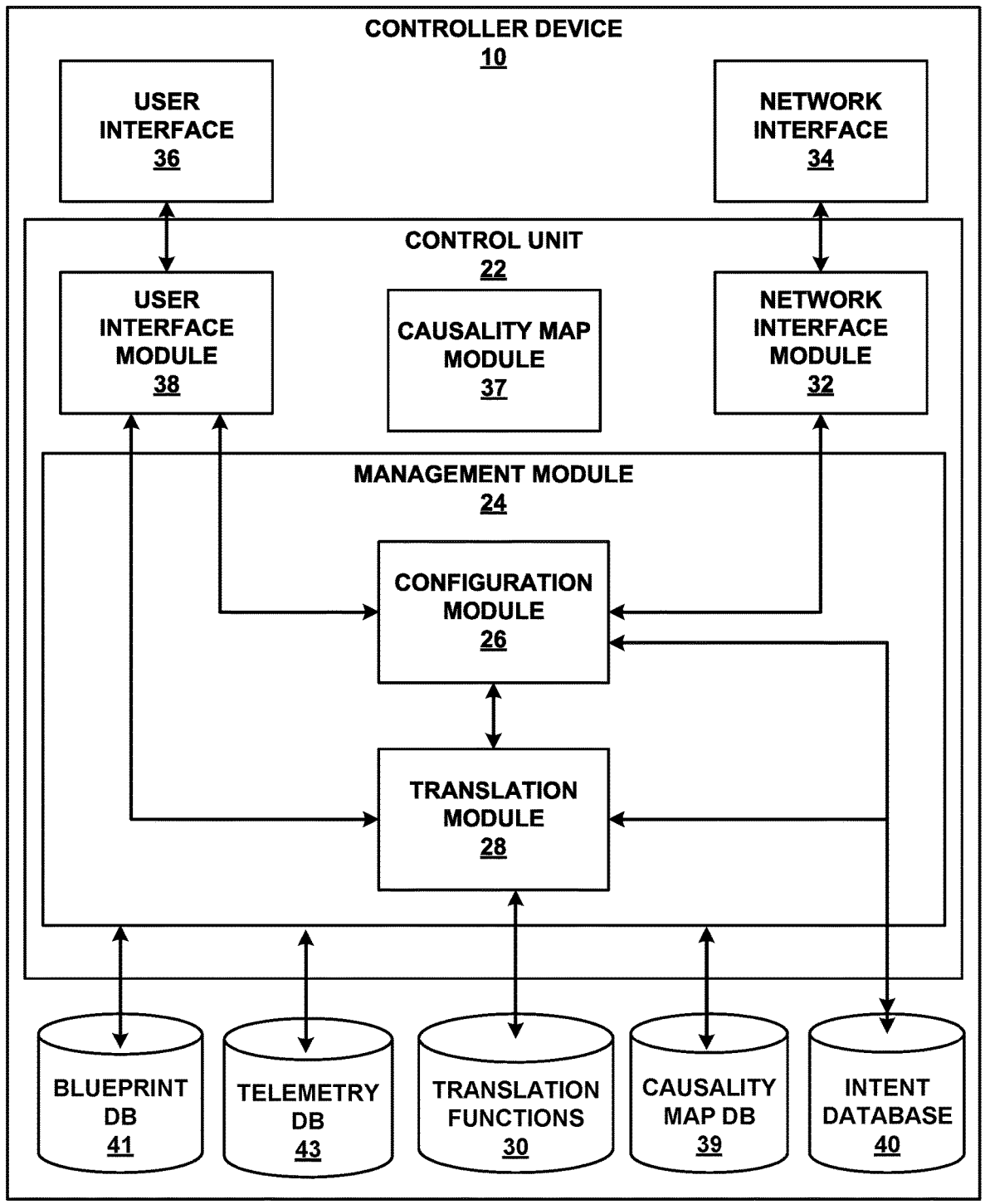
FIG. 2 is a block diagram illustrating an example set of components for the controller device of FIG. 1.

FIG. 2 is a block diagram illustrating an example set of components for controller device 10 of FIG. 1. In this example, controller device 10 includes control unit 22, network interface 34, and user interface 36. Network interface 34 represents an example interface that can communicatively couple controller device 10 to an external device, e.g., one of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Controller device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrator 12 (FIG. 1) interacts with controller device 10, e.g., to provide input and receive output. For example, user interface 36 may represent one or more of a monitor, keyboard, mouse, touchscreen, touchpad, trackpad, speakers, camera, microphone, or the like. Furthermore, although in this example controller device 10 includes a user interface, administrator 12 need not directly interact with controller device 10, but instead may access controller device 10 remotely, e.g., via network interface 34.

In this example, control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, and management module 24 may again be implemented as respective hardware units, or in software or firmware, or a combination thereof.

Control unit 22 executes management module 24 to manage various network devices, e.g., elements 14 of FIG. 1. Management includes, for example, configuring the network devices according to instructions received from a user (e.g., administrator 12 of FIG. 1) and providing the user with the ability to submit instructions to configure the network devices. In this example, management module 24 further includes configuration module 26 and translation module 28.

Management module 24 is configured to receive an intent (e.g., a high-level configuration instruction) for a set of managed network devices from a user, such as administrator 12. In some examples, management module 24 may be referred to herein as a "fabric manager." Over time, the user may update the configuration instructions, e.g., to add new services, remove existing services, or modify existing services performed by the managed devices. The intents may be structured according to, e.g., YANG. In some examples, management module 24 also provides the user with the ability to submit translation functions that translation module 28 executes to transform intents to device-specific, low-level configuration instructions, as discussed below.

Controller device 10 also includes intent database 40. Intent database 40 may include a data structure describing managed network devices, e.g., network elements 14. Intent database 40 may act as an intent data store, which may be used to persist and manage collections of intent graphs. For example, intent database 40 may include information indicating device identifiers (such as MAC and/or IP addresses), device type, device vendor, devices species (e.g., router, switch, bridge, hub, etc.), or the like. Intent database 40 may store current configuration information (e.g., intent data model, or in some cases, both intent data model and low-level configuration information) for the managed devices (e.g., network elements 14). Intent database 40 may include a database that comprises a unified intent data model.

Blueprint database 41 may store previously applied intent graph for the managed devices (e.g., network elements 14). Moreover, blueprint database 41 may associate each previously applied intent graph with a corresponding time range specifying when the intent graph was applied to network 2 (e.g., a start time and an end time or a start time and a duration that the intent graph was applied). Telemetry database 43 may store telemetry data for network 2 and associate the telemetry data with a time. For example, controller device 10 may store a snapshot for a first time (T1) and may store only changes in event driven data between T1 and a third time (T3).

Management module 24 may maintain a data structure in intent database 40. The data structure may include a plurality of vertices and a plurality of edges, each vertex of the plurality of vertices representing a respective network device of a plurality of network devices (e.g., network elements 14), and the plurality of edges defining relationships between the plurality of vertices. Management module 24 may receive an indication of a stateful intent. For example, management module 24 may receive intent unified-graph-modeled configuration data for a set of managed network devices from a user, such as administrator 12.

Translation module 28, which may also be referred to herein as a "device manager," may determine which devices are managed using intent database 40. Translation module 28 determines which of translation functions 30 to execute on the high-level configuration instructions based on the information of intent database 40, e.g., which of the devices are to receive the low-level configuration instructions. Translation module 28 then executes each of the determined translation functions of translation functions 30, providing the high-level configuration instructions to the translation functions as input and receiving low-level configuration instructions. Translation module 28 may then provide the low-level configuration instructions to configuration module 26.

After receiving the low-level configuration instructions from translation module 28, configuration module 26 sends the low-level configuration instructions to respective managed network devices for which configuration is to be updated via network interface module 32. Network interface module 32 passes the low-level configuration instructions to network interface 34. Network interface 34 forwards the low-level configuration instructions to the respective network devices.

Although user interface 36 is described for purposes of example as allowing administrator 12 (FIG. 1) to interact with controller device 10, other interfaces may be used in other examples. For example, controller device 10 may include a representational state transfer (REST) client (not shown) that may act as an interface to another device, by which administrator 12 may configure controller device 10. Likewise, administrator 12 may configure elements 14 by interacting with controller device 10 through the REST client.

Management module 24 may determine a causality map according to intent and store the causality map at causality map database (DB) 39. Management module 24 may generate the causality map to include a first plurality of nodes that each represent a respective root cause fault, a second plurality of nodes that each represent a respective symptom, and a third plurality of nodes that each represent a respective network service impact.

Cabling information for elements 14 may be considered part of the intent. In one example, administrator 12 may output a request to management module 24 to automatically assign interface names to interface nodes in the intent graph based on the model of the device. An algorithm may help to ensure that interface names are assigned such that interfaces with the proper speeds are used for each link. In some examples, the cabling information may be discovered automatically from device telemetry—for instance using the Link Layer Discovery Protocol (LLDP)—from an existing already-cabled network. This discovered cabling may be used to update the intent graph, which may override the output of the above algorithm.

As noted above, the intent stored by intent database 40 may represent a graph that models systems, interfaces, links, and/or workloads. Systems may be connected to one another via links. Each link has 2 interfaces, where each interface is hosted on each of the 2 systems the link is connecting. Systems may also host workloads. "has", "hosted" are relationships (e.g. graph edges) between those entities (e.g. graph nodes).

Management module 24 may execute a translation function that reads the intent graph stored in intent database 40. For example, the translation function may cause processing circuitry to run one or more queries on the graph to derive the causality map. For instance, the translation function may cause the processing circuitry to run the query "system 1->interface1->link<-interface2<-system2" to get all subgraphs in the graph that match that pattern of nodes and relationships. Each match may represent a link between 2 systems, and their interfaces. For each link in this example, the RCF "link/broken" has symptoms "interface1/operationallyDown", "Interface1/neighborMissing", "interface2/operationallyDown", "interface2/neighborMissing".

In this example, the intent may specify that 2 servers X and Y are connected to different leaves (e.g., leaf1 and leaf2), which are in turn connected to spine1 and spine2 in a full mesh. Moreover, in this example, there is a single link L that connects leaf1 and spine1. The translation function, when executed by processing circuitry, may run queries to derive the fact that servers X and Y uses link L (among other spine-leaf links) to communicate with one another (over multiple hops). But link L's breakage will reduce the amount of available bandwidth because there will be 1 less path between servers X and Y. Therefore, the RCF "L/broken" causes the impact "X-Y-traffic/reducedBandwidth".

In this example, there is a workload W hosted on servers X and Y. This could be modeled in the intent with the graph structure "W—hosted_on→X", and "W—hosted_on→Y". The translation function, via graph queries, finds these "hosted_on" relationships, and extends the causality chain so that impact "X-Y-traffic/reducedBandwidth" further propagates to the impact "W/performanceImpaired".

Thus, the causality map for this example looks like this:
RCF: L/broken
   RCF Propagates to (i.e. arrows going towards) symptoms (interfaces operationally down and neighbors missing)
   RCF Propagates to impact "X-Y-traffic/reducedBandwidth", which further propagates to "W/performanceImpaired Management module 24 may determine a causality map further based on a topology for elements 14. For example, the topology for elements 14 may include one or more of a 3-stage Clos network topology, a 5-stage Clos network topology, or a spine and leaf topology. In this example, management module 24 may determine a causality map based on the topology, a role (e.g., leaf or spine) assigned to each element of elements 14, and the intent. For example, management module 24 may generate the causality map based on an intent indicating to configure element 14A with a role as a first spine, element 14B as a second spine, and elements 14C-14D as leafs (see FIG. 3).

Causality map module 37 may be configured to generate a causality map based on an intent stored in intent database 40. For example, causality map module 37 may include a translation function that, when executed by processing circuitry, creates the causality map from intent. Causality map module 37 may output the causality map and telemetry data to a program (e.g., a program external to causality map module 37 or a program within causality map module 37) and the program may, when executed by processing circuitry, output a set of matched RCFs and the impacts the set of matched RCFs cause.

In some examples, causality map module 37 may include a machine learning module configured to apply a machine learning algorithm to determine a relevant portion of the causality map. For example, causality map module 37 may apply the machine learning module to a causality map stored by causality map database 39 to determine one or more causality relationships. As discussed further below, the machine learning module may be trained using the causality map and using symptoms and impacts for different of root cause faults. Management module 24 may apply pattern matching to the portion of the causality map. In this way, administrator 12 may be directed to a small set of potential root cause faults (e.g., 2), which may enable faster identification of the actual root cause fault and thereby reduce an amount of time that a customer is impacted by a network fault.

In accordance with the techniques of the disclosure, controller device 10 may be configured to determine relevant metrics at a time that occurred before a current time. For example, controller device 10 may store a plurality of intent graphs for network 2. Each intent graph of the plurality of intent graphs may include nodes representing components of network 2 and edges representing connections between the nodes. Each intent graph of the plurality of intent graphs may be associated with a corresponding different time range within a time period. Controller device 10 may receive a query indicating a time. In some examples, the query may indicate a network service.

Controller device 10 may determine a subset of telemetry data, from telemetry data received from a set of network devices of the network over the time period, that corresponds to the time range using the time indicated by the query. For example, controller device 10 may determine the subset of telemetry data from telemetry data stored in telemetry database 43 that corresponds to the time range using the time indicated by the query. Controller device 10 may determine the subset using snapshots as described in FIG. 6. Controller device 10 may generate, based on an intent graph of the plurality of intent graphs that is associated with a time range that includes the time indicated by the query and based on the subset of the telemetry data, one or more metrics. For example, controller device 10 may select an intent graph of the multiple intent graphs stored in blueprint database 41 that is assigned by blueprint database 41 a time range that includes the time indicated by the query. For example, controller device 10 may output the selected intent graph of blueprint database 41 and the subset of telemetry data determined using telemetry database 43 to an RCI core, which may generate one or more metrics (e.g., potential root cause faults) for review by the network administrator. In some examples, controller device 10 may output the selected intent graph of blueprint database 41 and the subset of telemetry data determined using telemetry database 43 to an analytics engine, which may generate one or more metrics (e.g., a receiver utilization for an interface, a transmitter utilization for an interface, or a speed) for review by the administrator.

Figure 3:
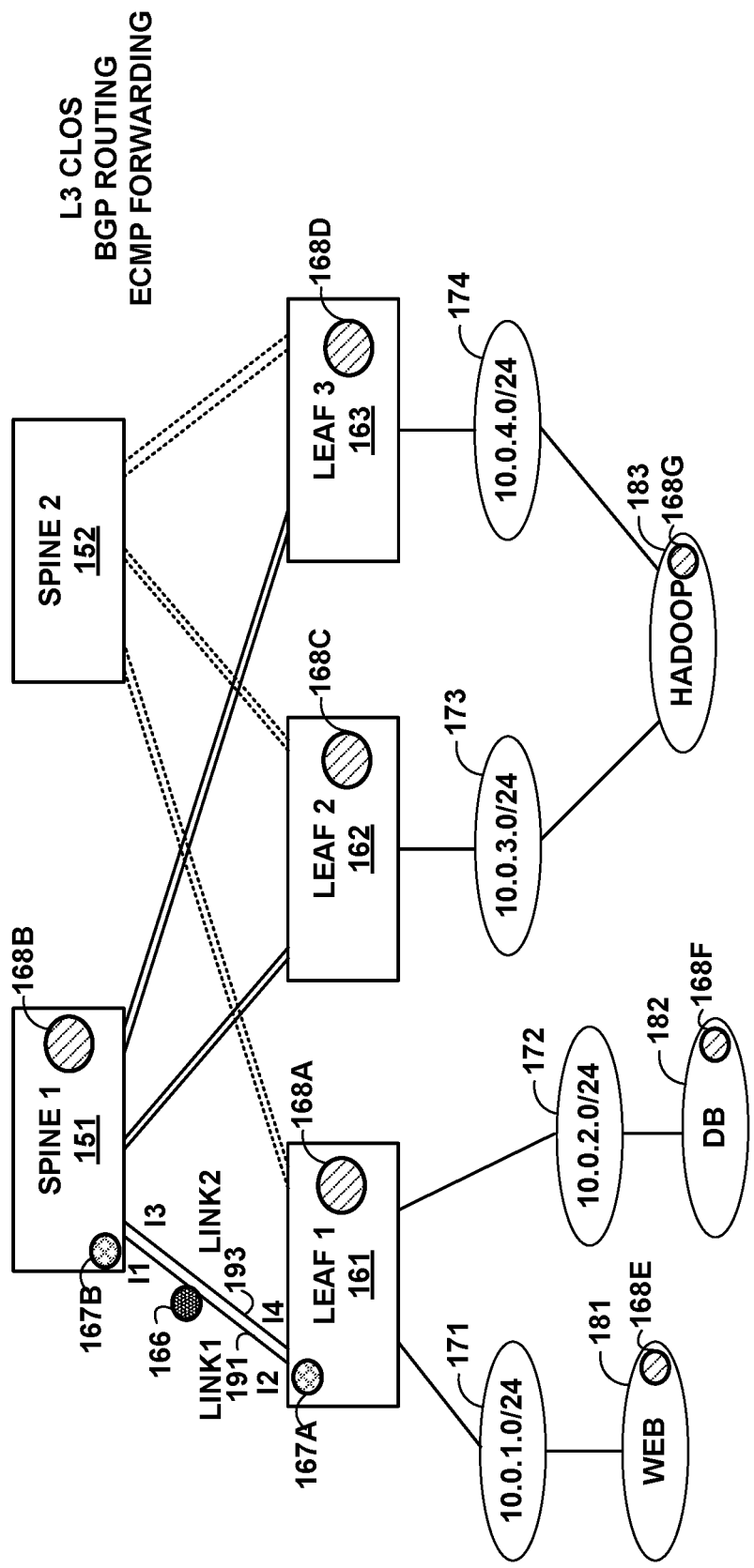
FIG. 3 is a conceptual diagram illustrating example root cause fault in accordance with the techniques of this disclosure.

FIG. 3 is a conceptual diagram illustrating example root cause fault in accordance with the techniques of this disclosure. FIG. 3 is discussed with FIGS. 1-2 for example purposes only. Spines 151, 152 and leafs 161-163 may be examples of network elements 14 of FIG. 1.

FIG. 3 illustrates a root cause fault 166 of link 191 being down may cause symptoms 167A, 167B to be observable by spine 151 and leaf 161 (e.g., interfaces being down). Impacts 168A-168G (collectively, impacts 168) may include poor network services at virtual networks. For instance, impact 168E may include poor network services at a first virtual network label 181 ("Web services") for a first range of network addresses 171 (e.g., 10.0.1.0/24). Impact 168F may include poor network services a second virtual network label 182 for "database processes (DB)" for a second range of network addresses 172 (e.g., 10.0.2.0/24). In this instance, impact 168G may include poor network services a third virtual network label 183 for "Hadoop compute clusters" for a third range of network addresses 173 (e.g., 10.0.3.0/24) and a fourth range of network addresses 174 (e.g., 10.0.4.0/24). Additionally, impacts 168 may include poor network services from telemetry data generated by leafs 161-163 and spine 151.

In some systems, network administrator 12 may use an analytics engine (e.g., implemented by controller device 10), which may help to generate intent-based analytics (IBA). An example benefit of IBA is the ability to analyze telemetry data across multiple devices and across time, contextualize the analysis using the intent graph, and automatically update the analysis when the intent graph is updated. For example, in the example L3 clos network of FIG. 3, there may be multiple paths between leaf1 161 and leaf2 126 and/or leaf3 163, via spine1 151 and a spine2 152. Administrator 12 might be interested in the available bandwidth for traffic between web application 181 and Hadoop 183. For example, a link1 191 and link2 193 connect leaf1 161 and a spine1 151. In this example, both link1 191 and link2 193 may have a maximum bandwidth of 40 Gbits/s. Device telemetry collected (e.g., stored at telemetry database 43) may indicate how much bandwidth is used for each link—e.g. transmitted bytes/s on the interfaces attached to link1 191 and link2 193 from the perspective of leaf1 161. The usage may be subtracted from the maximum link bandwidth to get the remaining available bandwidth of the links. For instance, link1 191 could have 25 Gbits/s available bandwidth, and link2 193 could have 20 Gbits/s of available bandwidth left. Therefore, traffic originating from leaf1 161 to leaf2 162 and/or leaf3 163 could still utilize up to 25+20=45 Gbits/s (out of the maximum 80 Gbits/s) available bandwidth to spine1 151. Then, on a Spine1->Leaf2/Leaf3 hop, controller device 10 could calculate the same available bandwidth. The analytics engine (e.g., implemented in controller device 10 or outside of controller device 10) may determine the overall available bandwidth as the minimum of the per-hop available bandwidth. The analytics engine may be configured to perform a similar computation to the path Leaf1->Spine2->Leaf2/Leaf3. The analytics engine may determine the full available bandwidth between web services 181 and Hadoop applications 183 as a sum of the available bandwidth of those paths. The intent graph (e.g., stored in blueprint database 41) may be used to derive the paths (Leaf1->Spine1->Leaf2/Leaf3, and Leaf1->Spine2->Leaf2/Leaf3), and which device telemetry (e.g., stored in telemetry database 43) may be used as input (e.g., packet counters on the interfaces of the links on those paths).

When the intent graph implemented by controller device 10 changes, the computation may be updated. For example, blueprint database 41 may store the intent graph and an indication of when the change occurred. For instance, if a new spine (Spine3) is added, there will be a new path Leaf1->Spine3->Leaf2/Leaf3. This leads to new computations for (a) the available bandwidth of that new path, and (b) the addition of that new path's available bandwidth to the total number.

Controller device 10 may be configured to use replay. For example, at the beginning of replay, an analytics engine may be configured according to the intent graph (e.g., stored at blueprint database 41) at the beginning timestamp t0. At t0, the intent graph may indicate that there are only 2 paths between Leaf1 and Leaf2/3 (e.g. via Spine1 and Spine2). The device telemetry may be replayed from a database (e.g., telemetry database 43) into the analytics engine, which may generate the metric of "total available bandwidth between web services 181 and Hadoop 183." Then at timestamp t1, an intent graph update is replayed—a new path via Spine3 is added. The analytics engine may be reconfigured to include the new computations, and new device telemetry is ingested from the MetricDb.

Figure 4:
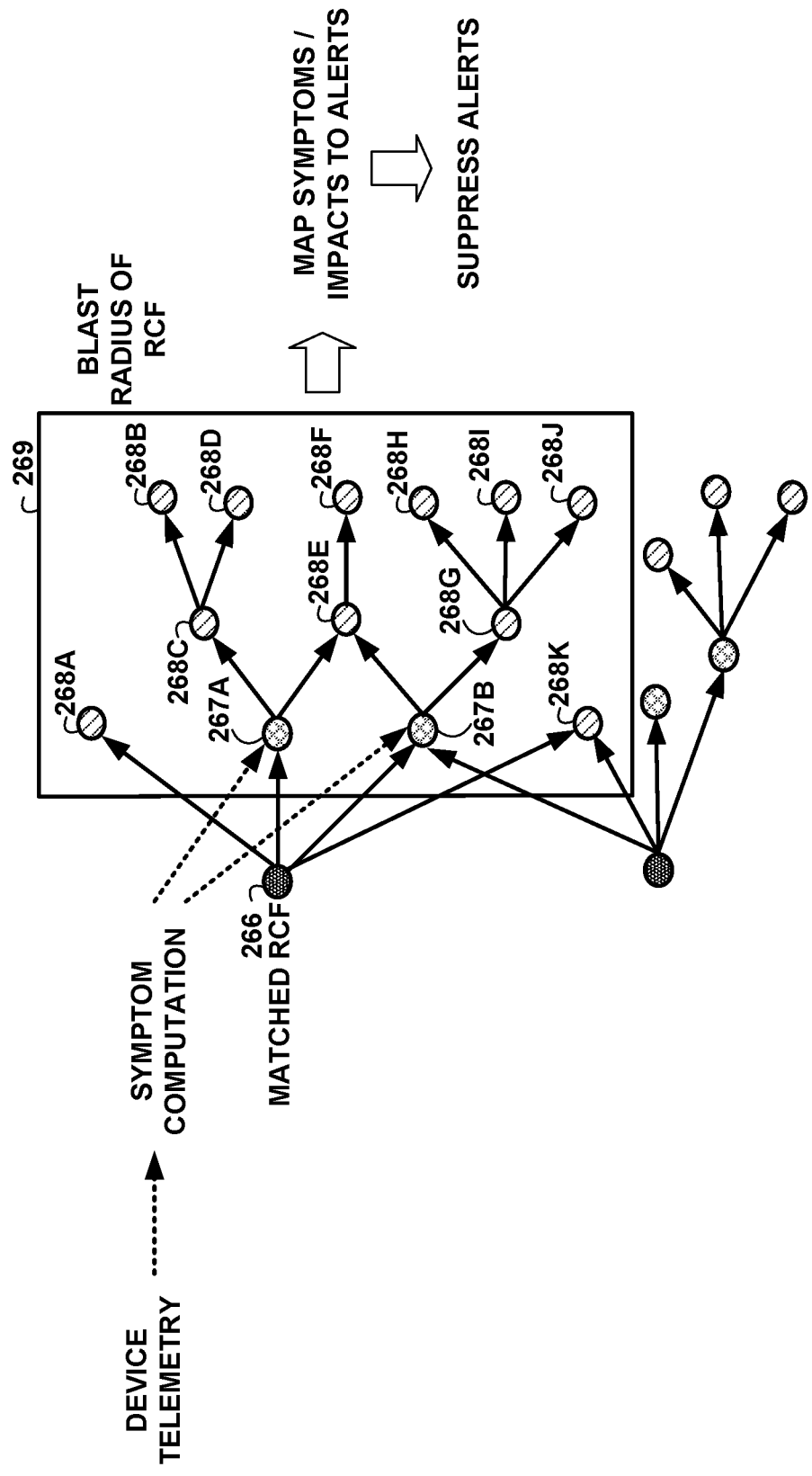
FIG. 4 is a conceptual diagram illustrating example of alert suppression in accordance with the techniques of this disclosure.

FIG. 4 is a conceptual diagram illustrating example of alert suppression in accordance with the techniques of this disclosure. FIG. 4 is discussed with FIGS. 1-3 for example purposes only. In the example of FIG. 4, in response to matching a root cause fault (RCF) 266 (e.g., "MATCHED RCF") to detected symptoms 267A, 267B, controller device 10 may suppress alerts in a blast radius 269 of the root cause fault 266. For example, controller device 10 may suppress a set of alerts using one or more candidate root cause faults. However, this approach may be limited by a number of RCFs that may be matched to symptoms and impacts. For example, there may be only a few RCFs that are matched for a system, which results in a limited number of alerts being suppressed. Moreover, the alert suppression techniques do not help to identify a RCF (e.g., RCF 266) from an impact (e.g., one or more of impacts 268A-268J).

Figure 5B:
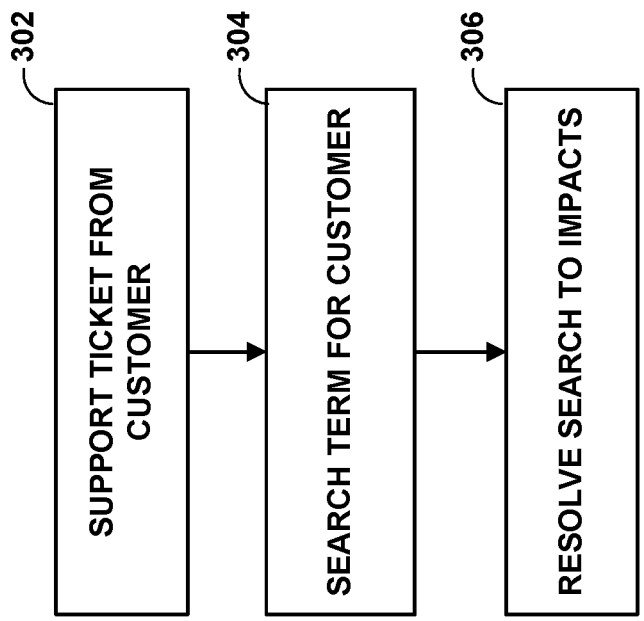
FIG. 5B is a flowchart illustrating an example process for impact analysis according to techniques of this disclosure.
Figure 5A:
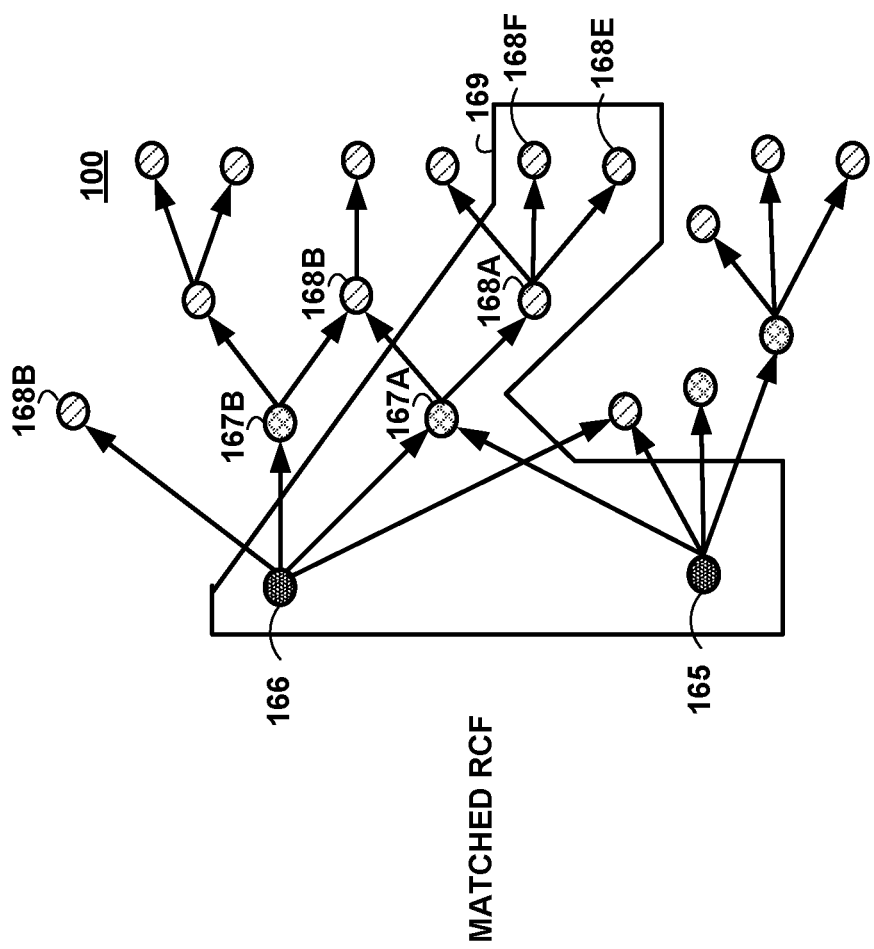
FIG. 5A is a conceptual diagram illustrating example causality map in accordance with the techniques of this disclosure.

FIG. 5A is a conceptual diagram illustrating example of causality map 100 in accordance with the techniques of this disclosure. Causality map 100 may include a first plurality of nodes that each represent a respective root cause fault, such as, for example, root cause faults 166, 165. Causality map 100 may further include a second plurality of nodes that each represent a respective symptom, such as, for example, symptoms 167A-167C. Causality map 100 may include and a third plurality of nodes that each represent a respective network service impact, such as, for example, impacts 168B, 168E, and 168F.

Each networking device (e.g., elements 10 of FIG. 1, spines 151, 152, or leafs 161-163 of FIG. 3 may include a serial number that is mapped to a label, that is mapped to a unique model identifier for the causality map 100. For example, controller device 10 may receive an intent to configure element 14A with a role as a spine and a label "Spine1." In this example, controller device 10 may determine a mapping of the serial number for element 14A to the label and from the label to the unique model identifier for causality map 100. Controller device 10 may determine causality map 100 according to the intent and based further on the mapping. In the example of FIG. 5A, the serial number for element 14A is mapped (e.g., using intent) to the label "Spine1," which is mapped to a unique model identifier for the node representing impact 168B. In this way, controller device 10 may determine, using the intent received from the administrator 12 to configure the particular network device as spine 151, causality map 100 that maps symptom 167A (e.g., interfaces being down) to impacts 168A, 168E, 168F (e.g., poor network connectivity).

Instead of alert suppression (see FIG. 4), controller device 10 may perform an impact analysis, which may help to more quickly resolve network impacts. For example, controller device 10 may generate causality map 100 based on an intent graph. Controller device 10 may generate the intent graph based on an intent provided by administrator 12. In this example, controller device 10 may use the causality graph to match an impact (e.g., received from a customer using network 2) with a set of symptoms to identify a set of root cause faults. FIG. 5A is discussed further with respect to FIG. 5B.

FIG. 5B is a flowchart illustrating an example process for impact analysis according to techniques of this disclosure. FIGS. 5A, 5B are discussed with respect to FIGS. 1-4 for example purposes only. Controller device 10 receives a support ticket from a customer (302). For example, the support ticket may be from a customer using a web services that reports impact 168E indicating a poor network experience. In some examples, however, the support ticket may report different combinations of impacts, for example, impacts for database services and/or for distributed processing services (e.g., Hadoop services).

In response to the support ticket from the customer, controller device 10 may search a term for a customer (304). For example, in response to a support ticket for a customer using web services, controller device 10 may search for first virtual network label 181 ("Web services"), which is associated with a first range of network addresses 171 (e.g., 10.0.1.0/24). In this example, controller device 10 may resolve the search to impacts (306). For example, controller device 10 may match impact 168E to symptom 167A and potential root cause faults 165, 166 as shown in FIG. 5A.

Controller device 10 may apply pattern matching to a model of the causality relationships for causality map 100. As shown in FIG. 5A, each node of a third plurality of nodes (e.g., impacts 168E, 168F) may comprises one or more first edges (e.g., lines) to one or more nodes in a second plurality of nodes (e.g., symptom 167A), and each node of the second plurality of nodes comprises one or more second edges to one or more nodes of the first plurality of nodes. In this example, controller device 10 may match the network service impact to one of the nodes in the third set of nodes and identify at least one node in the first set of nodes using the one or more first edges and the one or more second edges. For instance, controller device 10 may match the network service impact indicated in the support ticket to impact 168E and identify root cause faults 165, 166 using the one or more first edges and the one or more second edges.

Controller device 10 may determine that the one or more candidate root cause faults are within the relevant portion of the causality map indicated by a model of causality relationships 169. For example, controller device 10 may determine that impact 168E is associated with causality relationships 169 in response to determining that symptom 167A satisfies (e.g., matches) matching criteria for model of the causality relationships 169. While FIG. 5A illustrates only 2 root cause faults, causality map 100 may include more than 2 (e.g., more than 10 potential root cause faults, more than 100 potential root cause faults, or more than 1,000 potential root cause faults). As such, controller device 10 may reduce a number of potential root cause faults to the number of root cause faults in the model of the causality relationships 169 compared to all the potential root cause faults of causality map 100. Controller device 10, another device, or a cloud-based system, may determine the model of causality relationships 169 that map symptom 167A to impacts 168E, 168F and root cause faults 165, 166. In this way, administrator 12 may be directed to a small set of potential root cause faults (e.g., 2), which may enable faster identification of the actual root cause fault and thereby reduce an amount of time that a customer is impacted by a network fault.

Figure 6:
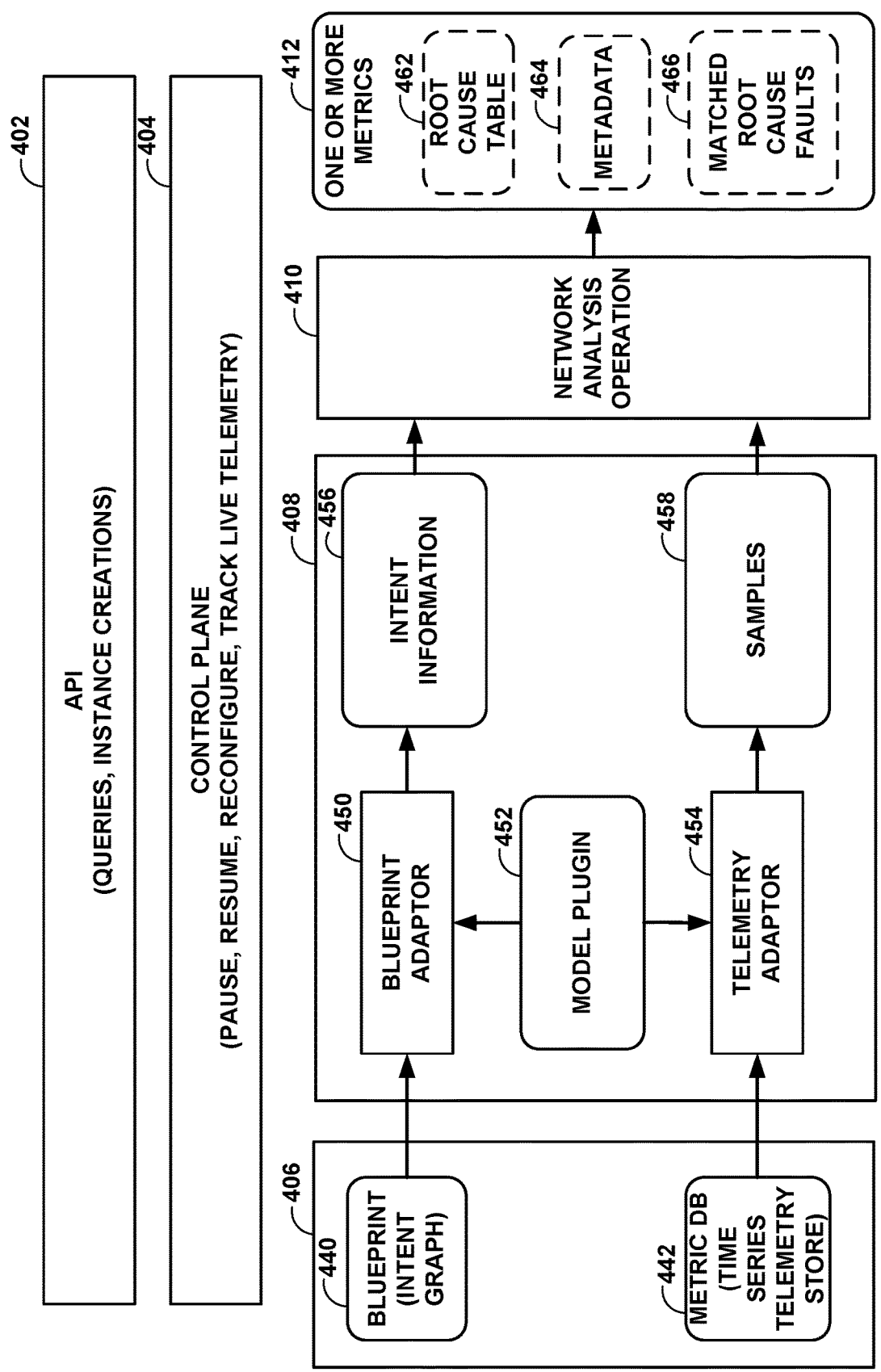
FIG. 6 is a conceptual diagram illustrating an example replay of one or more metrics for analytics of a network management system according to techniques of this disclosure.

FIG. 6 is a conceptual diagram illustrating an example replay of one or more metrics for analytics of a network management system according to techniques of this disclosure. Application Programming Interface (API) 402 may be configured to receive one or more of queries or instance creations. Model plugin 452, which may include application logic, may be configured to define queries for translation. For instance, API 402 may receive a query from administrator 12. Control plane 404 may be configured to, using model plugin 452, pause, resume, reconfigure, and/or track live telemetry data as described in further detail below. For example, a data storage module 406 may store intent graphs and telemetry information. In this example, processing module 408 may select an intent graph and a subset of telemetry data and network analysis operation may process the selected intent graph and the subset of telemetry data to generate one or more metrics 412.

More specifically, metric database (DB) 442 may use time series data collection techniques that non-periodically store event driven data based on the intent graph model, which may reduce an amount of data stored by the network controller and/or improve an accuracy of metrics stored for a particular time. For example, metric database 442 may store a snapshot for a first time (T1) and may store only changes in event driven data between T1 and a third time (T3). In this example, telemetry adaptor 454 may determine the samples (e.g., a complete state of the network at time T2) by applying all of the changes between T1 and a second time (T2) to the snapshot for T1. Telemetry adaptor 454 may generate indicator samples for a causality graph. In some examples, telemetry adaptor 454 may generate interface information, such as, one or more of an interface status, a temperature for the interface, or a power level for the interface. In some examples, telemetry adaptor 454 may translate or convert data from the metric database 442 to generate samples 458. For instance, telemetry adaptor 454 may generate, using a namespace mapping between metric database 442 and samples 458, a sample of samples 458 to indicate a temperature at an element of an interface based on telemetry data stored in metric database 442. The telemetry adaptor may then continuously output the complete state of the network using the changes to the telemetry data between T2 and T3 to the network analysis operation 410 (e.g., an RCI core or an analytics engine) in a "real-time" manner to reproduce the telemetry data between T2 and T3.

Similarly, the Blueprint module 440 may store a complete Blueprint that is implemented by the controller device at T1 and may store only changes to the Blueprint between T1 and T3. In this example, blueprint adaptor 450 may determine the Blueprint (e.g., the selected intent graph) by applying all of the changes between T1 and T2 to the complete Blueprint that is implemented by the controller device at T1. Blueprint adaptor 450 may determine intent information 456 to include a fault model (e.g., a causality graph) using the Blueprint. In this example, Blueprint adaptor 450 may continuously output the fault model (e.g., a causality graph) to network analysis operation 410 in a "real-time" manner to reproduce the network state between T2 and T3.

Network analysis operation 410 may include a root cause fault engine. In this example, blueprint adaptor 450 may determine a causality map for network 2 based on the selected intent graph. The causality map may include a first plurality of nodes that each represent a respective root cause fault (e.g., cable is broken), a second plurality of nodes that each represent a respective symptom (e.g., dropped packets detected using device telemetry), and a third plurality of nodes that each represent a respective network service impact (e.g., poor network connectivity for web services). In this example, blueprint adaptor 450 may determine a relevant portion of the causality map (e.g., a fault model) based on the network service and time.

Network analysis operation 410 (e.g., a root cause core or root cause fault engine) may determine one or more candidate root cause faults based on the relevant portion of the causality map and indicator samples output by telemetry adaptor 454. For instance, network analysis operation 410 may determine symptoms of network 2 and match the symptoms and network service impact to a portion of a causality map. Causality relationships of the causality map may be generated using, for example, a machine learning algorithm. Network analysis operation 410 may output an indication of the one or more candidate root cause faults. For example, network analysis operation 410 may output an indication of the one or more candidate root cause faults that are included in the portion of the causality map. As shown, network analysis operation 410 may output one or more metrics 412 to include, for example, a root cause table 462, metadata 464, or matched root cause faults 466. In this way, administrator 12 may be directed to a small set of potential root cause faults (e.g., less than 10, less than 5, less than 3, or only 1), which may enable faster identification of the actual root cause fault for administrator 12 and thereby reduce an amount of time that a customer is impacted by a network fault.

Network analysis operation 410 (e.g., a root cause core or root cause fault engine) may perform alert suppression and/or impact analysis with replay. For example, network analysis operation 410 may replay from a second time to a third time (e.g., T2->T3). At the end of the replay from the second time to the third time (e.g., T2->T3), network analysis operation 410 may raise one or more matched root cause faults and/or one or more anomalies. The anomalies could be persisted in and read from MetricDb 442. Control plane 404 may pause the operations of components processing module 408 and network analysis operation 410 (which may form a "data plane"). Administrator 12 may query API 402. The query provided by administrator 12 can ask which anomalies are suppressed by a matched RCF (e.g. alert suppression) and/or the query can supply an impact and ask for the RCF(s) that cause that impact (e.g. impact analysis).

Network analysis operation 410 may include an analytics engine. In this example, blueprint adaptor 450 may output the selected intent graph to network analysis operation 410 (e.g., an intent based analytics engine). For example, in an L3 clos network (see FIG. 3), there may be multiple paths between a first leaf (Leaf1) and a second and/or third leaf (Leaf2/3), via a first spine (Spine1) and a second spine (Spine2). Administrator 12 might be interested in the available bandwidth for traffic between the web applications and Hadoop applications. For example, a first link (Link1) and a second link (Link2) connect a first leaf (Leaf1) and a first spine (Spine1). In this example, both Link1 and Link2 have a maximum bandwidth of 40 Gbits/s. Telemetry adaptor 454 may collect device telemetry collected that indicates how much bandwidth is used for each link—e.g. transmitted bytes/s on the interfaces attached to Link1 and Link2 from the perspective of Leaf1. The usage may be subtracted from the maximum link bandwidth to get the remaining available bandwidth of the links. For instance, Link1 could have 25 Gbits/s available bandwidth, and Link2 could have 20 Gbits/s left. Therefore, traffic originating from Leaf1 to Leaf2/Leaf3 could still utilize up to 25+20=45 Gbits/s (out of the maximum 80 Gbits/s) available bandwidth to Spine1. Then, on the Spine1->Leaf2/Leaf3 hop, controller device 10 could calculate the same available bandwidth.

Network analysis operation 410 (e.g., an analytics engine) may determine the overall available bandwidth as the minimum of the per-hop available bandwidth. Network analysis operation 410 may be configured to perform a similar computation to the path Leaf1->Spine2->Leaf2/Leaf3. Network analysis operation 410 may determine the full available bandwidth between the web services and Hadoop applications as a sum of the available bandwidth of those paths. Blueprint adaptor 450 may use the intent graph to derive the paths (Leaf1->Spine1->Leaf2/Leaf3, and Leaf1->Spine2->Leaf2/Leaf3), and which device telemetry is used as input (e.g., packet counters on the interfaces of the links on those paths).

When the intent graph changes, processing module 408 may update the computation. For example, if blueprint 440 indicates that a new spine (Spine3) is added, there will be a new path Leaf1->Spine3->Leaf2/Leaf3. In response to the new path, processing module 408 may perform new computations for (a) the available bandwidth of that new path, and (b) the addition of that new path's available bandwidth to the total number.

Network analysis operation 410 (e.g., an analytics engine) may be configured to use replay. For example, at the beginning of replay, network analysis operation 410 may be configured according to the intent graph at the beginning timestamp to. At t0, the graph may indicate that there are only 2 paths between Leaf1 and Leaf2/3 (e.g. via Spine1 and Spine2). The device telemetry may be replayed from MetricDb 442 into network analysis operation 410, which may generate the metric of "total available bandwidth between web services and Hadoop." Then, at timestamp T1, an intent graph update is replayed—a new path via Spine3 is added. Network analysis operation 410 may be reconfigured to include the new computations and new device telemetry is ingested from MetricDb 442.

Blueprint adaptor 450 may output intent information 456 to include analytics configuration pipeline information. Analytics configuration pipeline information may specify one or more probes to monitor network information (e.g., monitor traffic between all spines and leaves). Telemetry adaptor 454 may output intent based analytics core samples to network analysis operation 410 (e.g., an intent based analytics engine). Network analysis operation 410 (e.g., an intent based analytics engine) may output, based on the computation on replayed telemetry, one or more of intent based analytics alerts or an indication of anomalies. Network analysis operation 410 may derive analytics by processing the analytics core samples based on the intent information. In this way, administrator 12 may be directed to a small set of alerts and/or anomalies (e.g., less than 10, less than 5, less than 3, or only 1), which may enable faster identification of potential network issues for administrator 12 and thereby reduce an amount of time that a customer is impacted by network issues.

In some examples, network analysis operation 410 (e.g., an analytics engine) may not raise alerts for IBA operations. Administrator 12 can choose to use IBA to perform computation on device telemetry and simply view the results. For example, in the probe example of available bandwidth between 2 services, there may be at least two components—(a) the pipeline that computes the available bandwidth, and (b) the optional piece that raises an alert when the available bandwidth is outside of a user-configured range. While raising an alert when the available bandwidth is outside of a user-configured range depends on the pipeline that computes the available bandwidth, raising the alert is optional. Administrator 12 may want the alert to be present because having alerts means administrator 12 may not need to periodically and manually check the computed results of the available bandwidth.

Control plane 404 may pause and resume a replay (e.g., when network analysis operation 410 includes an analytics engine and/or when network analysis operation 410 includes an root cause fault (RCF) engine). As previously noted, control plane 404 may replay from T2->T3 as specified by administrator 12. Administrator 12 can specify additional "pause conditions" for the replay. For example, administrator 12 can cause control plane 404 to pause the replay if a specific RCF X is matched at any time during the replay from T2->T3. As such, control plane 404 may pause the data plane (e.g., processing module 408 and network analysis operation 410) when RCF X is matched at T2. When the replay is paused, administrator 12 can make queries as above. Administrator 12 can choose to resume the replay, either to completion at the third time (T3) or to pause the replay again when one of the additional pause conditions is matched.

Additionally, the replay completion at T3 may represent a pause condition. Administrator 12 could ask the replay to continue from that timestamp to a later timestamp (e.g., a fourth time (T4)), and/or ask the data plane to catch up to live telemetry—e.g. replay as quickly as possible so that the intent and metrics from MetricDb 442 are read up to the current wall-clock time, and then the data plane will track and ingest the live samples as they are deposited into MetricDb 442. While the above examples of replay are directed to RCF matching, the above examples for replay may be used for use cases involving an analytics engine.

Figure 7:
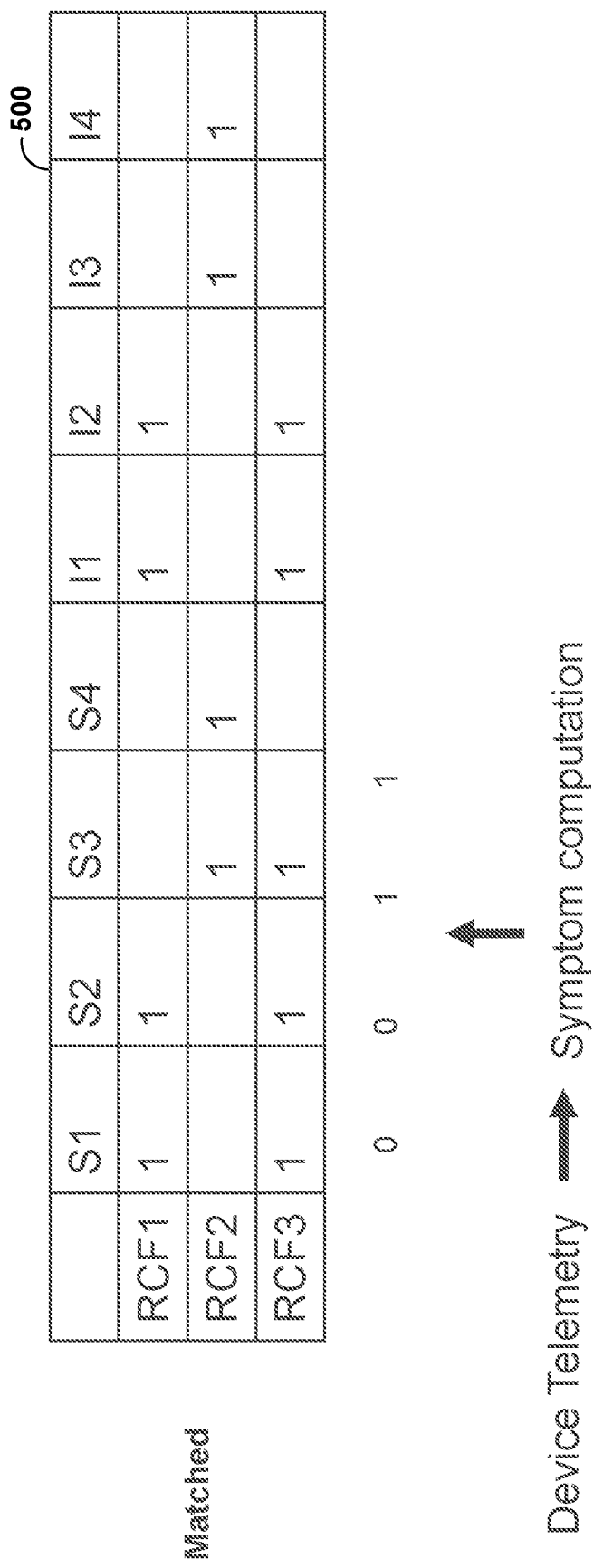
FIG. 7 is a conceptual diagram illustrating an example root cause table according to techniques of this disclosure.

FIG. 7 is a conceptual diagram illustrating an example root cause table 500 according to techniques of this disclosure. Network analysis operation 410 (e.g., a root cause core or root cause fault engine) may perform root cause fault (RCF) matching every round. For example, the root cause core may perform RCF matching between times T2 and T3 using the fault model output by Blueprint adaptor 450 and the indicator samples output by telemetry adaptor 454. The RCI core may output Root Cause table 500, which may be used to match root cause faults. In the example of FIG. 7, controller device 10 may receive a symptom computation [0 0 1 1] from network analysis operation 410 and root cause table 500. In this example, controller device 10 may match the symptom computation [0 0 1 1] to a second root cause fault (RCF2) that includes symptoms S3 and S4 without symptoms S1 and S2 to identify a potential root cause fault. In some examples, controller device 10 may further identify impacts I3 and I4 based on the matching of RCF2. Metadata 464 of FIG. 6 may specify details for one or more of symptoms S1-S4, impacts I1-I4, or RCF1-RCF3. For example, RCF2 may represent a slash or cut into a particular cable that results in symptoms S2 (e.g., an outage on a first interface using the cable) and S4 (e.g., an outage on a second interface using the cable) and impacts I3 and I4 (e.g., poor network connectivity for network services).

Figure 8:
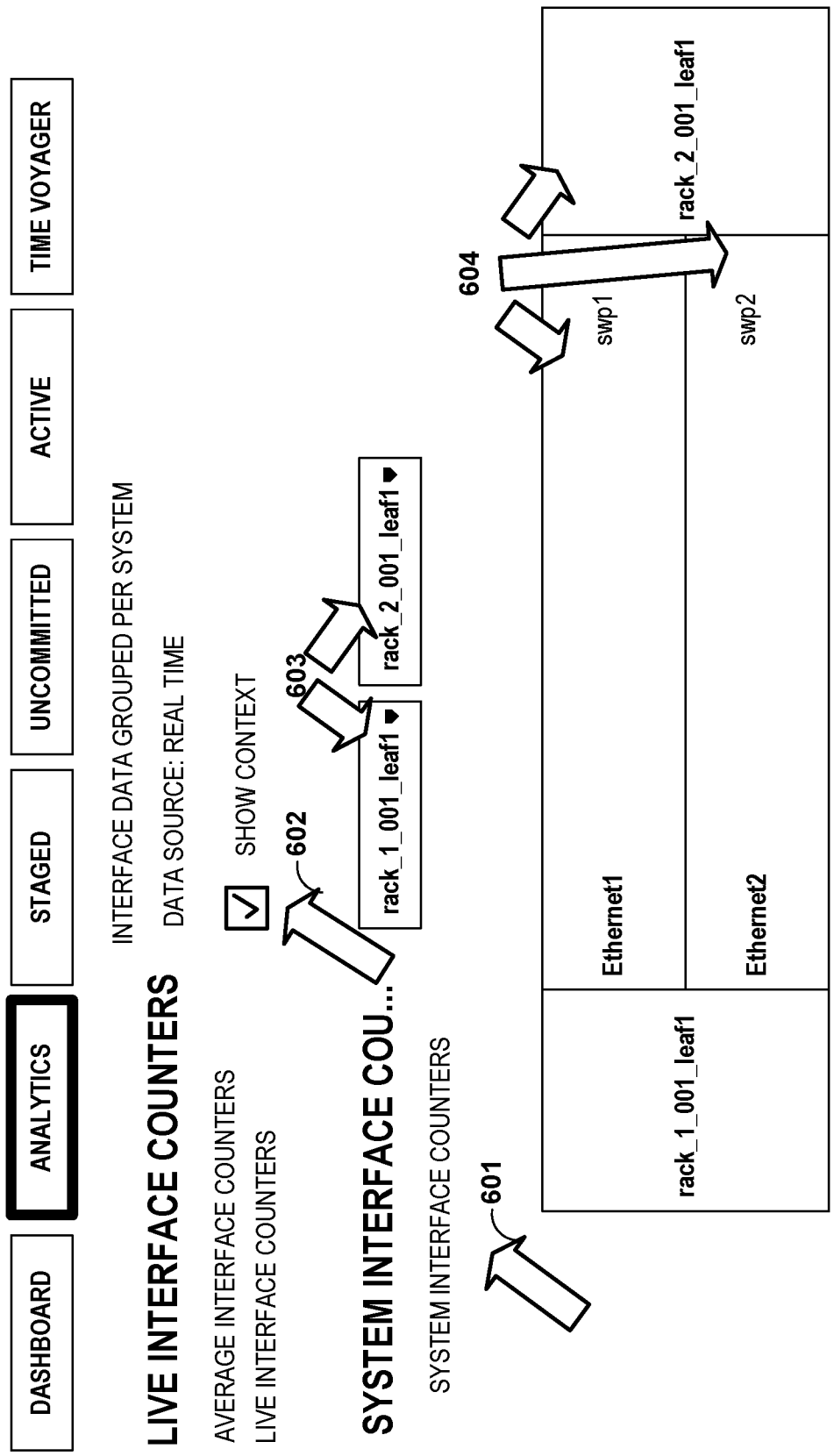
FIG. 8 is a conceptual diagram illustrating an example user interface presenting data for replay of one or more metrics for analytics of a network management system according to techniques of this disclosure.

FIG. 8 is a conceptual diagram illustrating an example user interface presenting data for replay of one or more metrics for analytics of a network management system according to techniques of this disclosure. In the example of FIG. 8, administrator 12 may select system interface counters (601), check a box to show context (602), and select rack 1 and rack 2 (603). In this example, administrator 12 may roll over portions (604) to show more information, such as, for example, the information shown in FIG. 9. In this way, controller device 10 may provide functionality enabling an administrator to "replay" metrics for a time range that occurred in the past. For example, administrator 12 may pause, play, resume, rewind, or fast-forward a replay of metrics independently from a current operation of the network and while allowing software and hardware changes to the network. The controller device 10 may present the user interface of FIG. 8 that displays the replayed relevant metrics to administrator 12. In this way, controller device 10 may enable administrator 12 to replay metrics that have occurred and account for network changes of network 2, which may help to reduce an amount of time that administrator 12 reviews metrics in response to an event.

FIG. 9 is a conceptual diagram illustrating an example of information 610 displayed in response to an interaction by the administrator according to techniques of this disclosure. As shown, information 610 may include one or more of an average alignment errors per second, an average frame check sequence (FCS) errors per second, an average number of Giants per second, an average number of Runts per second, an average received bits per second, an average transmitted bits per second, an average received broadcast packets per second, an average transmitted broadcast packets per second, an average received discard packets per second, an average transmitted discard packets per second, an average received error packets per second, an average transmitted error packets per second, an average received multicast packets per second, an average transmitted multicast packets per second, an average received unicast packets per second, an average transmitted unicast packets per second, an average receiver (Rx) utilization, an average transmitter (Tx) utilization, an average symbol errors per second, or a speed (e.g., in Gigabits per-second or Gbps). A Giant may refer to a frame that is larger than a maximum transmission unit (MTU) defined on the interface. A Runt may refer to a frame that is smaller than a maximum transmission unit (MTU) defined on the interface. As used herein, "average" may refer to a short term average, such as the mean over 5 seconds. Therefore, as the replay (e.g., spanning much more than 5 seconds) progresses, controller device 10 may recompute the average values illustrated in FIG. 9.

Figure 10:
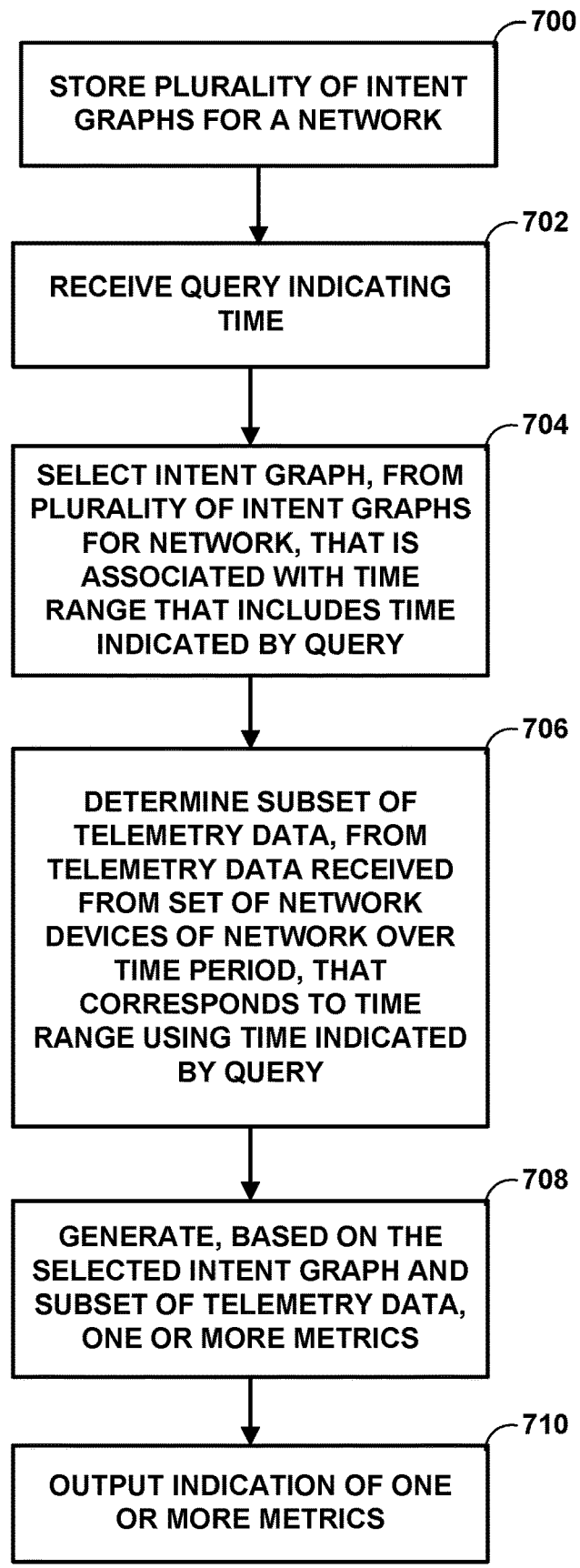
FIG. 10 is a flowchart illustrating an example process for a replay of analytics according to techniques of this disclosure.

FIG. 10 is a flowchart illustrating an example process for a replay of analytics according to techniques of this disclosure. FIG. 10 is discussed with FIGS. 1-4, 5A, 5B, and 6-9 for example purposes only. Controller device 10 may store a plurality of intent graphs for a network 2 (700). Each intent graph of the plurality of intent graphs may include nodes representing components of network 2 and edges representing connections between the nodes. Each intent graph of the plurality of intent graphs may be associated with a corresponding different time range within a time period.

Controller device 10 may receive a query indicating a time (702). For example, controller device 10 may receive the query from administrator 12. In some examples, the query may indicate a network service. The time indicated by the query may correspond to a past outage of the network service managed by controller device 10 or a past service impact of the network service managed by controller device 10.

Controller device 10 may select an intent graph, from a plurality of intent graphs for network 2, that is associated with a time range that includes the time indicated by the query (704). Controller device 10 may determine a subset of telemetry data, based on the indicated time, from a database of telemetry data received from a set of network devices of the network over the time period, that corresponds to (e.g., includes) the time range using the time indicated by the query and the network service indicated by the query (706).

Controller device 10 may generate, based on the selected intent graph and the subset of the telemetry data, one or more metrics (708). For example, controller device 10 may perform a network analysis operation using the selected intent graph and the subset of the telemetry data to generate the one or more metrics. The network analysis operation may include using a root cause engine and controller device 10 may output the selected intent graph and the subset of the telemetry data to the root cause fault engine and receive the one or more metrics from the root cause fault engine in response to outputting the selected intent graph and the subset of the telemetry data to the root cause fault engine. The one or more metrics output by the root cause fault engine comprises one or more of root cause data indicating for each root cause fault of a plurality of root cause faults, a respective set of one or more symptoms and one or more impacts; or an indication of one or more candidate root cause faults.

Controller device 10 may determine a causality map for the plurality of network devices and for the time range using the selected intent graph. The causality map may include a first plurality of nodes that each represent a respective root cause fault associated with the plurality of network devices, a second plurality of nodes that each represent a respective symptom provided, at least in part, by the plurality of network devices, and a third plurality of nodes that each represent a respective network service impact associated with the plurality of network devices. In this example, controller device 10 may determine a relevant portion of the causality map based on the network service indicated by the query. Controller device 10 may determine one or more candidate root cause faults based on the relevant portion of the causality map.

In some examples, the network analysis operation comprises an analytics operation. In this example, to perform the network analysis operation, controller device 10 may output the selected intent graph and the subset of the telemetry data to an analytics engine and receiving the one or more metrics from the analytics engine in response to outputting the selected intent graph and the subset of the telemetry data to the analytics engine. For instance, controller device 10 may receive one or more intent-based analytics alerts.

Controller device 10 may output an indication of the one or more metrics (710). For example, controller device 10 may generate data representing a user interface presenting the one or more metrics. In this example, controller device 10 may output for display, the data representing the user interface. In some examples, controller device 10 may output an indication of one or more candidate root cause faults. In some examples, controller device 10 may output an indication of one or more of an average alignment of errors per second for a network device of the plurality of network devices, an average Frame Check Sequence (FCS) errors per second for the network device, an average number of received bits per second for the network device, or an average transmitted bits per second for the network device.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

What is claimed is:

1. A method comprising:
   storing, by processing circuitry, a plurality of intent graphs for a network, wherein each intent graph of the plurality of intent graphs comprises nodes representing components of the network and edges representing connections between the nodes and wherein each intent graph of the plurality of intent graphs is associated with a corresponding different time range within a time period;
   receiving, by the processing circuitry, a query indicating a time;
   determining, by the processing circuitry, a subset of telemetry data, from telemetry data received from a set of network devices of the network over the time period, that corresponds to the time indicated by the query;
   selecting, by the processing circuitry and from the plurality of intent graphs, an intent graph that was implemented during a time range that includes the time indicated by the query, wherein the selected intent graph is different from an intent graph currently implemented for the network;
   generating, by the processing circuitry and based on the selected intent graph and based on the subset of the telemetry data, one or more metrics; and
   outputting, by the processing circuitry, an indication of the one or more metrics.

2. The method of claim 1, wherein outputting the indication of the one or more metrics comprises:
   generating data representing a user interface presenting the one or more metrics; and
   outputting, for display, the data representing the user interface.

3. The method of claim 1, wherein the query further indicates a network service and wherein determining the subset of telemetry data is based on the network service indicated by the query.

4. The method of claim 1, wherein the one or more metrics comprise one or more of:
   root cause data indicating for each root cause fault of a plurality of root cause faults, a respective set of one or more symptoms and one or more impacts; or
   an indication of one or more candidate root cause faults.

5. The method of claim 1, wherein the one or more metrics comprise an indication of one or more candidate root cause faults and wherein generating the one or more metrics comprises:
   determining a causality map for a plurality of network devices of the network and for the time range using the selected intent graph, wherein the causality map comprises a first plurality of nodes that each represent a respective root cause fault associated with the plurality of network devices, a second plurality of nodes that each represent a respective symptom provided, at least in part, by the plurality of network devices, and a third plurality of nodes that each represent a respective network service impact associated with the plurality of network devices.

6. The method of claim 5, wherein generating the one or more metrics further comprises:
   determining a relevant portion of the causality map based on a network service indicated by the query; and
   determining the one or more candidate root cause faults based on the relevant portion of the causality map,
   wherein outputting the one or more metrics comprises outputting an indication of the one or more candidate root cause faults.

7. The method of claim 1, wherein the one or more metrics comprise one or more intent-based analytics alerts.

8. The method of claim 1, wherein the one or more metrics comprises receiving one or more of:
   an average alignment of errors per second for a network device of the network;
   an average Frame Check Sequence (FCS) errors per second for the network device;
   an average number of received bits per second for the network device; or
   an average transmitted bits per second for the network device.

9. A network management system comprising:
   memory configured to store telemetry data received from a set of network devices of a network over a time period and configured to store an indication of each intent graph of a plurality of intent graphs for the network, wherein each intent graph of the plurality of intent graphs comprises nodes representing components of the network and edges representing connections between the nodes and each intent graph of the plurality of intent graphs is associated with a corresponding different time range within the time period; and
   processing circuitry coupled to the memory;
   wherein the memory stores instructions that, when executed, cause the processing circuitry to:
   receive a query indicating a time;
   determine a subset of the telemetry data that corresponds to the time indicated by the query;
   select, from the plurality of intent graphs, an intent graph that was implemented during a time range that includes the time indicated by the query, wherein the selected intent graph is different from an intent graph currently implemented for the network;
   generate one or more metrics based on the selected intent graph and the subset of the telemetry data; and
   output an indication of the one or more metrics.

10. The network management system of claim 9, wherein, to output the indication of the one or more metrics, the instructions cause the processing circuitry to:
    generate data representing a user interface presenting the one or more metrics; and
    output, for display, the data representing the user interface.

11. The network management system of claim 9, wherein the query further indicates a network service and wherein the instructions cause the processing circuitry to determine the subset of telemetry data based on the network service indicated by the query.

12. The network management system of claim 9, wherein the one or more metrics comprises one or more of:
- root cause data indicating for each root cause fault of a plurality of root cause faults, a respective set of one or more symptoms and one or more impacts; or
- an indication of one or more candidate root cause faults.

13. The network management system of claim 9, wherein the one or more metrics comprise an indication of one or more candidate root cause faults and wherein, to generate the one or more metrics, the instructions cause the processing circuitry to:
- determine a causality map for a plurality of network devices of the network and for the time range using the selected intent graph, wherein the causality map comprises a first plurality of nodes that each represent a respective root cause fault associated with the plurality of network devices, a second plurality of nodes that each represent a respective symptom provided, at least in part, by the plurality of network devices, and a third plurality of nodes that each represent a respective network service impact associated with the plurality of network devices.

14. The network management system of claim 13, wherein, to generate the one or more metrics, the instructions further cause the processing circuitry to:
- determine a relevant portion of the causality map based on a network service indicated by the query; and
- determine the one or more candidate root cause faults based on the relevant portion of the causality map,
- wherein, to output the one or more metrics, the instructions cause the processing circuitry to output an indication of the one or more candidate root cause faults.

15. The network management system of claim 9, wherein the one or more metrics comprise one or more intent-based analytics alerts.

16. The network management system of claim 9, wherein the one or more metrics comprises receiving one or more of:
- an average alignment of errors per second for a network device of the network;
- an average Frame Check Sequence (FCS) errors per second for the network device;
- an average number of received bits per second for the network device; or
- an average transmitted bits per second for the network device.

17. Non-transitory computer-readable storage media having stored thereon instructions that, when executed, cause processing circuitry to:
- store a plurality of intent graphs for a network, wherein each intent graph of the plurality of intent graphs comprises nodes representing components of the network and edges representing connections between the nodes and wherein each intent graph of the plurality of intent graphs is associated with a corresponding different time range within a time period;
- receive a query indicating a time;
- determine a subset of telemetry data, from telemetry data received from a set of network devices of the network over the time period, that corresponds to the time indicated by the query;
- select, from the plurality of intent graphs, an intent graph that was implemented during a time range that includes the time indicated by the query, wherein the selected intent graph is different from an intent graph currently implemented for the network;
- generate, based on the selected intent graph and based on the subset of the telemetry data, one or more metrics; and
- output an indication of the one or more metrics.

18. The non-transitory computer-readable storage media of claim 17, wherein the instructions that cause the processing circuitry to output the indication of the one or more metrics cause the processing circuitry to:
- generate data representing a user interface presenting the one or more metrics; and
- output, for display, the data representing the user interface.

19. The non-transitory computer-readable storage media of claim 17, wherein the query further indicates a network service and wherein the instructions cause the processing circuitry to determine the subset of telemetry data based on the network service indicated by the query.

20. The non-transitory computer-readable storage media of claim 17, wherein the one or more metrics comprises one or more of:
- root cause data indicating for each root cause fault of a plurality of root cause faults, a respective set of one or more symptoms and one or more impacts; or
- an indication of one or more candidate root cause faults.

* * * * *